JUNCTION TRANSISTOR

Original Filed Aug. 1, 1960

Inventor:
Ernst Fröschle
by: George U. Spencer
Attorney

Inventor:
Ernst Fröschle
by: George H. Spencer
Attorney

United States Patent Office
3,436,618
Patented Apr. 1, 1969

3,436,618
JUNCTION TRANSISTOR
Ernst Fröschle, Ulm (Danube), Germany, assignor to Telefunken Aktiengesellschaft, Berlin, Germany
Continuation of application Ser. No. 46,678, Aug. 1, 1960. This application Sept. 8, 1966, Ser. No. 578,099
Claims priority, application Germany, Aug. 6, 1959, T 17,044
Int. Cl. H01l 5/02, 11/06
U.S. Cl. 317—235 22 Claims

ABSTRACT OF THE DISCLOSURE

A pn-junction transistor having a semiconductor crystal body including two zones of one conductivity type as emitter and collector zones separated by a zone of opposite conductivity type. Two separate electrodes are provided, the same being ohmically connected to the base zone at spaced apart points. One of the two electrodes is electrically interconnected with the emitter zone, so that an electrical field is provided in the base for the purpose of restricting the emission current flow from said emitter zone.

This application is a continuation of application 46,678, filed Aug. 1, 1960, now abandoned.

A tetrode arrangement has already been devised whose basic part consists of n-conductive silicon. In these semiconductor basic bodies of the n-type two diffusion layers are diffused, one an n-layer and one a p-layer extending in front of this n-layer. The diffused n-layer represents the emitter zone of the tetrode while the p-conductive type zone extending in front of the n-layer forms the base zone of the tetrode. The impurity concentration of the n-layer is in this case made greater than that of the p-layer. In the manufacture of the auxiliary base electrode and of the control base electrode p-doped strip-shaped electrodes are alloyed through both diffusion layers, while contact is made to the emitter zone by an electrode alloyed flat into the emitter zone between the two base electrodes.

By applying a suitable voltage between auxiliary and control base electrodes an electric field can be produced along the base zone of this known tetrode arrangement which confines the emission of the tetrode to a narrow portion of the emitter zone, said narrow portion being immediately adjacent to the control base electrode. The known arrangement has the advantage that the external base resistance, which appears between the alloyed control base electrode and the beginning of the immediately adjacent emitter zone, is negligeably small. As in the known arrangement the effective internal base resistance in the region of the emitter zone can also be kept small, namely by corresponding reduction of the width of the emitting zone with the aid of the longitudinal field in the base zone, the known arrangement exhibits, by suitable dimensioning and doping of the base zone, the smallest base resistance of all known transistor arrangements.

In the known tetrode arrangement however there are basic drawbacks which are connected with technological difficulties so that the high frequency characteristic of this known arrangement is no better than that of the other known high frequency transistor arrangements.

These drawbacks of the known Mesa type tetrode arrangement are attributable above all to the fact that, unlike known transistor arrangements, three electrodes are arranged on the emitter side. The result is that, in order to obtain small collector capacities in arrangements which are intended for an operating frequency of several hundred megacycles per second, the Mesa structure or Mesa surface may not be substantially wider than 100$\mu$ so that the mutual spacing of the connecting wires in the known tetrode arrangement can not be made greater than 25 to 30$\mu$. For higher frequencies correspondingly smaller spacings are necessary. It is obvious that the small spacing of the electrodes arranged on the emitter side makes the contacting of said electrodes considerably more difficult. Moreover in consequence of the small electrode spacing only very thin wires can be used as electrode leads, said wires exhibiting however relatively high lead resistances and lead inductances which more than anything have a very adverse effect at high frequencies.

In order to avoid these drawbacks it is proposed according to the invention that in the case of a surface junction transistor with emitter, base and collector zones two electrodes are provided on the emitter side, that the first of these electrodes is ohmically connected with the base zone and that, in order to limit the emission to the portion of the emitter zone in the immediate vicinity of the first electrode by producing an electric field in the base zone, the second electrode is also ohmically connected with the base zone and makes a barrier or ohmic contact with the emitter zone.

FIGURE 1 is a sectional view of a transistor according to the present invention in which two electrodes which make nonblocking contact with the base zone abut directly on both sides of the emitter zone, the doping being so selected that the pn-junction between the emitter zone and the semiconductor region of one electrode has the characteristics of a backward diode; the emission current from the emission current conductive electrode flows to the emitter zone via this pn-junction.

FIGURE 5 also shows the intrinsically conductive zone as being thinner in the two emission regions than throughout its remainder.

Figure 1:
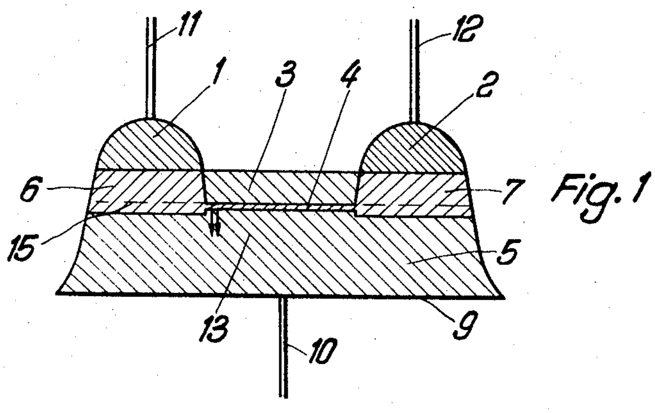

The arrangement according to the invention, which is represented in various embodiments in FIGURES 1 to 5, will be described in more detail with the example of a transistor with pnp-zones although of course analogous embodiments with npn-zones are possible. Already now it is pointed out that a special embodiment of the invention, as in FIGURES 3 to 5, of a transistor arrangement is considered in which a weakly doped or intrinsically conductive intermediate zone is provided between base and collector zones. It proves to be advantageous to design such a pnip-or npin-transistor arrangement with tetrode characteristics according to a modification of the invention as a Mesa type.

The transistor arrangement with pnp-zones to be considered, as already mentioned above, will be explained in the following with the example of a semiconductor body made of germanium although of course other semiconductor materials, as for example silicon or the $A_{III}B_{V}$ combinations, can be used. The emitter zones 3 of such pnp-transistor is heavily doped with p-impurities while the relatively thin base zone 4 is heavily combined with n-impurities but only to such an extent that the density of impurities in the base zone is less than the impurity density in the emitter zone. The collector zone 5 adjoining the base zone 4 is, so as to obtain a p-conductive type, like the emitter zone doped with p-impurities.

As opposed to known tetrode arrangements only two electrodes are alloyed into the emitter-side surface of this pnp-transistor. The alloy material for both these alloy electrodes is so chosen that, by means of the alloy, heavily n-doped semiconductor zones 6 and 7 belonging to alloy electrodes 1 and 2 are created. These and the following considerations are of course valid in analogous manner for transistors having a reversed layer series.

The arrangement according to the invention is now connected like a normal transistor and, like the latter, has altogether three electrode leads, namely the collector electrode lead 10 contacting collector electrode 9, electrode lead 11 contacting alloy electrode 1 and electrode lead 12 which is connected to alloy electrode 2. In the operating condition of the transistor there also now flows through electrode lead 12, in addition to the emission current, a further current from alloy electrode 2 to alloy electrode 1 through the base zone, said current producing, as in the case of a tetrode, the longitudinal field necesary for restricting the emission. The essential advantage of the invention lies in the fact that the tetrode effect is obtained by a three electrode arrangement.

By heavily doping the emitter zone 3 and the adjoining semiconductor zone 7 belonging to alloy electrode 2 the pn-junction formed by the semiconductor zone and emitter zone in the junction region attains a very low Zener break down voltage, which is less than 0.5 volts or exhibits the characteristic curve of a so-called "backward diode." With such a characteristic of the pn-junction formed by the emitter zone 3 and by the semiconductor zone 7 of alloy electrode 2 the current can, as in the case of the arrangement of FIGURE 1, flow to the emitter via this pn-junction so that for emitter zone 3 no metallic coating ohmically connected to the alloy electrode 2 is required. Transistors of this type of construction are relatively easy to manufacture and show satisfactory amplification properties at several hundred megacycles per second.

Figure 2:
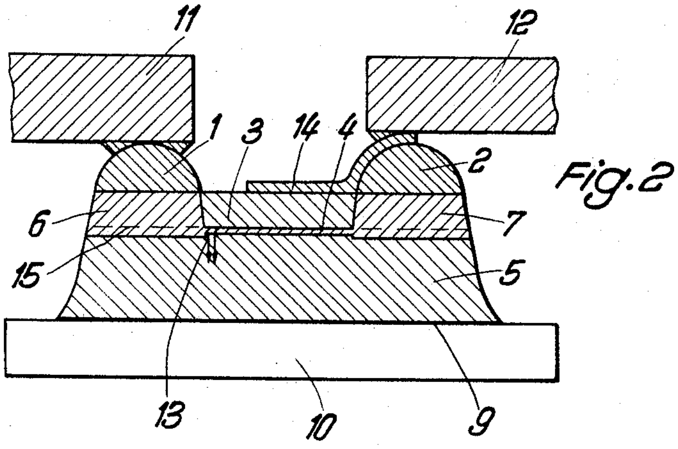
FIGURE 2 is a sectional view of another embodiment of a transistor according to the present invention in which the emission conductive electrode is electrically conductively connected with the emitter zone by means of a metallic coating so that the current from the emission current conducting electrode may reach the emitter zone directly via this metallic coating.

If however greater demands are put upon the described semiconductor arrangement, more particularly with regard to frequency limit, then the resistance of the emitter zone 3 between alloy electrode 2 and the emitting point 13 becomes noticeably troublesome. It is therefore advantageous, as shown in FIGURE 2, to apply to the emitter zone 3 a metallic coating 14 having metallic contact with electrode 2 but not with electrode 1. The metallic coating 14 is extended so far that a safe spacing between coating 14 and electrode 1 remains so as to avoid a short circuit, i.e., it is favourable for the high frequency characteristic of the transistor according to the invention if the emitter zone is coated with metal as extensively as possible to a specific, technologically required safe distance from electrode 1.

The fact that the arrangement according to the invention requires, in spite of the tetrode character, only two electrode leads on the emitter side makes it possible to construct the electrode leads larger than in the case of three electrode leads present on the emitter side and in consequence to make them of low ohmic resistance and inductance. FIGURE 2 shows by way of example an arrangement with strip shaped electrode leads 11 and 12 whose width perpendicular to the plane of the drawing can be chosen about equal to the corresponding length of electrode strips 1 and 2.

Figures 3, 4, 5:
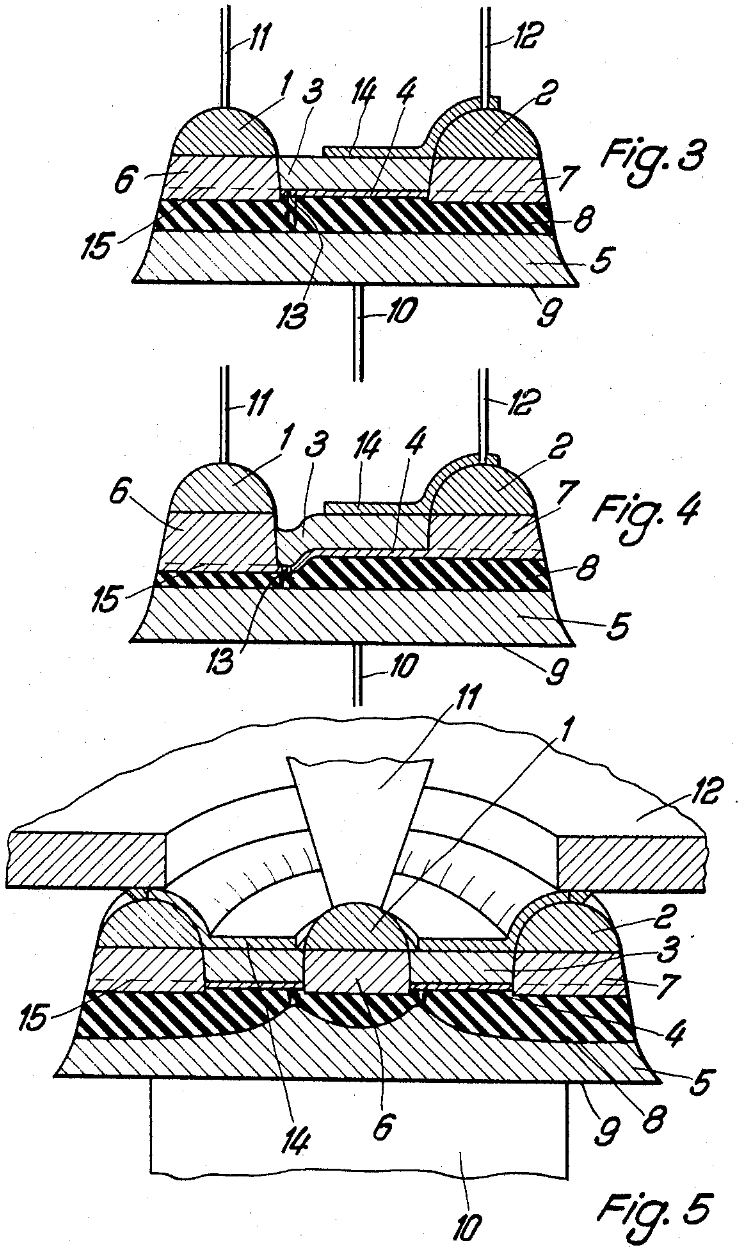
FIGURE 3 is a sectional view of yet another embodiment of a transistor according to the present invention in which an intrinsically conductive zone is provided between the base and collector zones.
FIGURE 4 is a sectional view of still another embodiment of a transistor according to the present invention in which an intrinsically conductive zone provided between between the base and collector zones is thinner in the region of the emission than throughout its remainder.
FIGURE 5 is a sectional view of a still further embodiment of a transistor according to the present invention in which the emission conductive electrode is fashioned as a ring electrode; the base electrode is arranged in the center of this ring.

Electrode 2 can also, as shown in FIGURE 5, be so constructed that it completely encloses, in the form of a ring, for example, electrode 1. Besides the advantage that in this arrangement no surface leakage current can reach electrode 1 from the collector, the electrode leads 10, 11 and 12 can be so made, as in FIGURE 5, that the transistor can easily be built into a coaxial line, the emitter lead 12 being connected to the outer conductor. Likewise electrode 1 may enclose the annular electrode 2. Tests proved that such devices make possible the utilization of an especially thin base zone 4 because no surface breakdown can occur across the exposed rim of the thin base zone 4.

It has been proved that more than anything the collector bias resistance of the known tetrode arrangement contributes substantially to the fact that the known arrangement is unuseable at very high frequencies. Detailed calculations have shown that at very high frequencies the losses in the collector zone 5 make the main contribution to the real part of the output admittance of such a tetrode and thus greatly reduce the oscillatory limit. In order to avoid these losses a modification of the invention is proposed in which the collector zone 5 is very highly doped, for example with $10^{17}$ to $10^{20}$ impurities per $cm.^3$ and an intrinsically conductive zone 8 is provided as in FIGURE 3, between base zone 4 and collector zone 5.

This intermediate zone 8 can be either slightly n- or p-conductive for the reason that such slight n- or p-doping is technologically more easy to carry out. However, any n-doping of zone 8 must only be of such value that in the emission zone 13 the space charge zone of the pn-junction on the collector side extends at least across the whole width of the high ohmic zone 8 when the lowest provided operating voltage is applied between collector and base.

The smallest losses and simultaneously voltage-independent reaction capacities and output capacities are obtained when the junction between the heavily doped collector zone 5 and the high ohmic zone 8 falls off abruptly and the high ohmic intermediate zone 8 is so slightly doped that the space charge zone of the collector barrier layer extends through the complete zone 8, i.e., from the highly doped region of base zone 4 up to the highly doped region of collector zone 5.

For many applications it is desirable that not only the real parts of the output and reaction admittances be small, as is attained in the above proposal by an intrinsic intermediate zone 8 of equal size, i.e., equal width, but also the reactive elements. This can be effected, according to a modification of the invention, by making the spacing between base and collector zones, i.e., the width of the intrinsic zone, smaller at that point than in the remaining regions of the intrinsic zone at which the emission substantially results. This means therefore that the width of the intrinsic zone varies and in the region of the preferred emitting point 13 must be smaller than in the remaining regions if the reactive elements are to be produced.

This requirement can be realised, as in FIGURE 4, by making the base zone deeper in the emission region 13 than in the other regions while keeping the width of the collector zone unchanged. Another way, as in FIGURE 5, is by not making the collector zone 5 uniform but of varying width and in such manner that the spacing between base and collector zones at the emission points 13 is less than in the remaining regions. In other words the intrinsic zone 8 should, in this special case, be made thinner at the emission points than in the remaining regions. A closed annular design of the electrode 2 stops the danger of surface breakdown in such an arrangement in which the intermediate zone 8 is thicker in the outer regions than in the inner.

In this connection it is pointed out that the above described means, namely the insertion of an intrinsic zone between collector and base zones and varying dimensions of the width of this intrinsic zone, can also be equally applied to normal transistor arrangements without tetrode effect and also in these arrangements a substantial improvement of oscillatory limit results by reduction of the output admittance.

The above mentioned measures concerned the avoidance of high frequency losses. With the highest frequency transistors care should moreover be taken that the current amplification $\beta$ in emitter-base circuit is as large as possible. If $f_1$ indicates that frequency at which the current amplification $\beta$ falls to the value 1 then the known equation:

$$\frac{1}{2}\pi f_1 = \frac{1}{2}\tau_C + \tau_B + \tau_E + \tau_R$$

is true. $\tau_C$ here is the transit time of the minority carriers through the collector barrier layer, $\tau_B$ their transit time through the base zone. The other values $\tau_E$ and $\tau_R$ represent the time constants of the parallel circuit of the emission resistance with the static emitter capacity ($\tau_E$) or the edge capacity ($\tau_R$). The edge capacity results at the boundary between the emitter zone 3 and the semiconductor zone 6 of electrode 1.

The collector transit time $\tau_C$ is proportional to the collector barrier layer thickness and $W_{SC}$ and inversely proportional to the average drift velocity of the minority carriers. As the output admittance of the transistor is very greatly dependent upon the collector capacity it is advantageous to make $W_{SC}$ as large as possible so that $f_1$ is substantially determined by $\tau_C$. Accordingly $$\frac{1}{2}\tau_C \geqq \tau_B + \tau_E + \tau_R$$

As with tetrodes and also with the arrangement according to the invention the emitting zone is very narrow and directly bounded at the electrode 1 it is necessary not to alloy the electrode 1 too deeply in so that the field strength of the collector field at the emitting point 13 is not reduced in consequence of screening effects caused by the semiconductor zone 6 of electrode 1. Electrode 1 should therefore also in arrangements without high ohmic or intrinsically conductive intermediate layer, not be alloyed into the semiconductor body deeper than half the thickness of the collector barrier layer.

The holes reach a velocity limit of about $5\times10^6$ cm./sec. in germanium where there is a field strength of $E_m=10^4$ v./cm. or more. For $v=v_m$ the collector transit time $\tau_C=W_{SC}/v_m$ amounts to $2\times10^{-11}$ seconds.

In dimensioning the transistor according to the invention it must be ensured that the field strength in the collector barrier layer is greater than or at least equal to this field strength $E_m$. When no emission current has yet commenced the voltage $U_o$ in the collector barrier layer must be greater than 1 v. per 1$\mu$ of collector barrier layer thickness. If on the other hand an emission current flows through the collector barrier layer then there develops in the collector barrier layer a space charge which is given by the ratio of current density $j_E$ to drift velocity. This space charge necessitates however an additional collector voltage, the value of which depends upon the consideration that a definite voltage is coordinated with a certain space charge thickness and barrier layer thickness.

To obtain a high current density $j_E$ and therewith a small $\tau_E$ it is advantageous to operate the transistor at the highest possible voltages i.e., at a third to a half the break down voltage $U_o$ which for germanium pnip-transistors having a barrier layer thickness of 1$\mu$ is about 20 v. Accordingly with a collector voltage of 10 v. the arrangement according to the invention can, with current densities $j_E$ be operated up to 8,000 A/cm.$^2$ without a reduction of drift velocity of the holes or of space charge limited emission occurring.

It is obvious that such high current densities, in consideration of the resulting heat, can only be obtained in arrangements in which, as in the case of the arrangement according to the invention and also of tetrodes, the emitting zone is very narrow. Even with abrupt pn-junctions between emitter and base zones $\tau_E$ is relatively small in comparison with $\tau_C$. Thus for example where there is a base doping of $10^{18}$ impurities per cm.$^3$ and a potential drop $V_{EB}$ of 0.1 v. across this emitter-base carrier layer, the thickness of barrier layer will amount to about $1.4\times10^{-6}$ cm. and the specific static emitter capacity $C_{ES}$ to $1\times10^{-6}$ f./cm.$^2$ whilst the emitter time constant $\tau_E$ will have the value of $3\times10^{-12}$ seconds.

From these considerations it becomes apparent that with transistor arrangements which operate with such high current densities the lower emitter-base-capacitance of a gradual doping distribution between emitter and base zones gives only a slight improvement. Such a doping distribution acts even negatively for with about double thickness of barrier layer between emitter and base zones at these high current densities stoppage of holes occurs on both sides of the barrier layer resulting in a large increase of emitter-base capacity. Moreover with the same base thickness a concentration distribution having a lower impurity concentration at the barrier layer to the emitter than in the middle of the base zone gives a substantially greater base transit time than a concentration distribution with uniform doping or with base doping decreasing from emitter to collector.

Thus with semi-conductor arrangements, which are intended for amplification of extremely high frequencies, it is unfavourable to manufacture the emitter and base zones by the double diffusion method, as is for example the case with known tetrode arrangements, because then a weakly doped junction zone always results between emitter and base zones and is about as wide as the base zones.

It is therefore advantageous according to a modification of the invention, to make the pn-junction between emitter and base zones abrupt. Such an abrupt pn-junction can, as is described for example in more detail below, be made by diffusion from an alloyed emitter zone which contains a small amount of faster diffusing impurities of the opposite conductive type than the main part of the emitter zone impurities e.g., as in a germanium semiconductor body by the addition of Sb in the gallium doped emitter. With this alloy-diffused method the impurities which determine the conductive type of the base zone can, in certain circumstances, become very greatly enriched at the emitter boundary so that extremely high static emitter-base capacities occur.

This effect can be prevented however if the emitter zone is not doped higher than the degeneration density at room temperature $T_Z$ (with Ge about $10^{-19}$ impurities per cm.$^3$) and if the maximum base doping $N_{Bm}$ is equal to or less than $T_Z T_D$ times the intrinsic conductive density $n_i$ at that temperature $T_D$ at which the base zone is manufactured by diffusion. $T_Z$ and $T_D$ are here measured in Kelvin degrees. Finally, cooling must be as rapid as possible. At a temperature $T_D$ of 973° K., equivalent to 700° C., the intrinsic conductive density $n_i$ for germanium is approximately equal to $3.4\times10^{18}$ impurities per cm.$^3$ so that a maximum base doping of about $1\times10^{18}$ impurities per cm.$^3$ is possible.

If for example an approximately linearly decreasing base layer distribution with $10^{18}$ impurities per cm.$^3$ maximum doping is taken and a base layer thickness $W_B$ of $1.5\times10^{-5}$ cm. then from known equations a base transit time $\tau_B$ of $3.8\times10^{-12}$ seconds can be calculated. The specific sheet resistance $R_B$ of the base zone is however relatively high. By specific surface resistance is meant the resistance of a square of the conducting base layer on the contact faces. Moreover the emitter current densities $j_E$ reach considerable values at high frequency limits $f_1$ and thus determine a high specific capacitive admittance between emitter and base. The result is that the high frequency alternating voltage between base layer and emitter falls rapidly with increasing distance from the base connection. An effective emitter width $B_{EW}$ may be defined as 0.7 times the distance from the edge of the emitter at which the voltage between base and emitter has fallen to the 2.7th part of the input voltage. $B_{EW}$ is at the same time the width of a transistor with $R_B=0$—but with equal $\tau_E$, $\tau_C$, $\tau_B$—which with the same current density $j_E$ and same frequency $f$ exhibits the same amount of transconductance and input resistance as a transistor with finite $R_B$ being essentially wider.

As at the $f_{10}$ frequency limit the specific admittance of the static and dynamic capacity between emitter and base is about $j_E/U_T$ the following equation can be derived from known formulas for a homogeneous electric line at frequency $f$:

$$B_{EW} \approx B_{EW_0} \cdot \sqrt{f_{10}/f}, \text{ where } B_{EW_0} = \sqrt{U_T/R_B j_E}$$

and $f_{10}$ is that frequency at which the current amplification falls to unity without taking into account the edge zone influence.

The frequency limit without edge zone ($\tau_R \to 0$) is, in the case of the arrangement used as a numerical example, equal to $9.5 \times 10^9$ c./s. At this frequency limit the effective emitter width $B_{EW}$ is equal to $0.61\mu$ and at $f=3{,}000$ Mc./s. about $1.1\mu$.

The frequency limit $f_{10}$ will be greatly reduced by the capacity of the edge barrier layer between emitter zone 3 and semiconductor zone 6 of electrode 1. If a thickness $W_R$ of $1\mu$ is taken for the emitter zone 3 and a maximum doping $N_R = 4N_B = 4 \times 10^{18}$ impurities per cm.$^3$ is taken for the edge zone, where $N_B$ represents the base doping, then $\tau_R$ is approximately equal to $$\tau E \frac{W_R}{B_{EW}} \times \sqrt{\frac{N_R}{N_B}}$$

The frequency limit $f_1$ including the edge zone is thus substantially less than $f_{10}$ for the given numerical example, namely 6,000 megacycles per second. It is therefore advantageous to reduce the edge capacity by making the emitter zone thin so that the boundary surface between the first electrode and the emitter zone is equal to or smaller than the emitting surface.

Further it is favourable to make a graduated pn-junction between the semiconductor zone 6 of electrode 1 and emitter zone 3. This is best effected by doping the emitter zone 3 only about 3 to 10 times higher than the base zone 4 and the zone 6 at least twice as highly as the emitter zone.

If now the final thickness $W_B$ of base zone 4 is made after the alloying of electrodes 1 and 2, by brief tempering at a temperature which is only a little below the maximum alloying temperature then the easily moved donors of the semiconductor zone 6 will diffuse into the emitter zone 3 and will form a graduated pn-junction.

It is pointed out that the above equations are derived for a transistor having a very wide emitting region. If only a narrow strip of the emitter emits, as in the arrangement according to the invention, then the current amplification is smaller.

If $B_{EE}$ indicates the distance from the semiconductor zone 6 of electrode 1 at which the emission of the emitter zone has fallen to the 2.7th part then in the unfavourable case, namely when the frequency limit is determined only by the static emitter—or edge—capacity ($\tau_E + \tau_R \gg \tau_C/2 + \tau_B$), the ratio $\beta/\beta_o$ equals $$\frac{1}{1 + \frac{\sqrt{j} B_{EW}}{B_{EE}}}$$

written vectorially, where $\beta$ represents the current amplification of the tetrode, $\beta_o$ the current amplification of a transistor with relatively broad emission zone and $j$ the imaginary unit vector. For $B_{EE} = B_{EW}$ then $\beta$ equals $0.54 \times \beta_o$. For large signal amplification and production of oscillations it is advantageous to make $B_{EE}$ smaller than or equal to $B_{EW}$ for then the whole emitter current can be controlled. If a high $\beta$ is desired for amplification of small signals then $B_{EE}$ can advantageously be increased to approximately $3B_{EW}$. In a strip shaped transistor arrangement as in FIGURES 1 to 4 with uniform base sheet resistance is $B_{EE} = U_T \times B_E / U_{EB}$.

Here $B_E$ is the width of the emitter zone 3 between the electrodes 1 and 2, $U_T$ is 25 mv. and $U_{EB}$ the operating voltage between emitter and base which for germanium arrangements amounts to about 0.5 v. In a linear arrangement $B_{EE}$ will be approximately equal to $B_E/20$. Depending upon the desired operating conditions an emitter width of 10–100$\mu$ for the arrangement according to the invention is favourable.

In producing a transistor as in FIGURE 1 a start is made from p-doped semiconductor slices having a specific resistance of about 0.3 to 1Ω cm. Then a p-doping metal, for instance In with some Ga, is deposited under a high vacuum in a thin layer on the semiconductor slice with the addition of a small percentage addition of n-doping material (As or Sb) and produces the emitter zone by alloying. During subsequent tempering the mobile n-impurities diffuse via the alloy zone into the basic material and form a n-conductive base zone.

The metal layer is then removed by a suitable acid and the semiconductor slice split up into elements of about $1 \times 1 \times 0.5$ mm.$^3$ size. Finally two alloy pellets of about 80$\mu$ diameter and consisting for example of In-Sb-Ag alloy are alloyed on in usual manner about 130$\mu$ apart and finally tempered at a somewhat lower temperature. After a brief etching, a strip about 70$\mu$ wide along the connecting line between the two alloy pellets is covered by the photoresist method and a Mesa etching carried out. After removal of the photoresist coating the semiconductor element can be soldered on to a transistor socket and contacted by two small silver bands.

For transistors as in FIGURE 2, zinc for example, is deposited on the surface of the transistor element after removal of the photoresist coating. Then those parts of the emitter surface which are to receive a metal coating are again covered by means of the photoresist method. The zinc is then removed from the uncovered parts by a brief etching in diluted nitric acid and the semiconductor element is set upon its mounting as above.

The annular arrangement of FIGURE 5 may be manufactured by vacuum deposition of the alloy materials with appropriate shielding or by electro deposition after masking of the other parts of the semiconductor surface with photoresist. In order to make a coaxial arrangement similar to that of FIGURE 5 with spherical alloy pellets it is adviseable to manufacture three or more transistors by the above process on a semiconductor slice and to arrange them in a star shape. Such a construction enables all the external electrodes of these transistors to contact a perforated metal disc, like electrode 2 in FIGURE 5, and all the internal electrodes to make common connection through a cylindrical or conical inner conductor as is done with electrode 1 in FIGURE 5. The transistors can also be so arranged that instead of a number of internal electrodes only one internal electrode is used which is common to all transistor arrangement.

With the Mesa type pnip-arrangement of FIGURE 3 semiconductor slices have to be manufactured which are very strongly p-doped internally and have a uniformly thin, about 1 to 10$\mu$ depending upon the transistor type, weakly n-doped surface layer.

Such slices are most easily obtained if an electrode (e.g., with In) of large surface, extending across almost the whole slice, is alloyed, by the method used in power rectifiers, on to thicker slices of the requisite weakly n-doped surface layer.

The alloy and cooling requirements are so chosen that the alloy face is as even as possible against the basic material and the monocrystalline portion of the recrystallised germanium layer is as thick as possible. Further-more the alloy face should lie close under the opposite surface of the slice.

An n-doped auxiliary contact (base) is alloyed into the edge of the slice and provided, as are the In electrodes, with lead wires and covered with a suitable insulating varnish. The uncovered front side of the thus prepared slice is etched by an automatically limiting electrolytic etching process. During etching a negative voltage is applied between the rear-side electrode and the auxiliary contact so that a barrier layer forms at the rear-side contact, the thickness of this layer depending upon the doping of the n-material and the voltage applied to the rear-side contact. Between electrolyte and auxiliary contact is applied a voltage which is also negative but which must be smaller than the voltage applied between the rear-side electrode and the auxiliary contact.

By means of a strong light source an approximately 100$\mu$ broad strip of light is projected through the electrolyte on to the slice to be etched and is moved slowly, perpendicularly to its longer axis, across the slice.

The germanium is rapidly etched at the illuminated points. The etching however stops automatically when the rear-side barrier layer (actually the barrier layer which corresponds to the voltage difference between rear-side electrode and electrolyte) is reached.

In this way highly p-doped slices can be made which have a weakly n-doped thin layer of exactly determined thickness on the surface. After removal of the covering and of the metal layer from the rear-side these slices, as already stated, are provided with an emitter and base layer.

In the case of semiconductor arrangements as in FIGURE 4 the intrinsic zone 8 must be thicker on the non-emitting than on the emitting portions. This can easily be effected by the above process by first adjusting the voltage appropriate to the lesser layer thickness and then illuminating only those parts of the semiconductor slice at which later the layer thickness of the intrinsic zone is to be thinner than at the remaining parts. Finally the bias voltage is raised and etching of the remaining surface, in strip fashion as described, is carried out to the desired layer thickness of the intrinsic zone.

The layer configuration shown in FIGURE 5 can be effected for example by the following process. P-doping electrodes are alloyed to a depth of about 10–15$\mu$ into a slice of weakly n-doped semiconductor material at those points which later are to form a thin high ohmic zone 8. Then a thin layer of p-doping substance, in for example, is applied to this surface in such a way as to cover the whole surface. On this layer is pressed a second semiconductor slice and the whole is so heated to an alloying temperature that the second semiconductor slice receives a higher temperature than the first slice. In this way a semiconductor body is obtained having a strongly p-doped half and an n-doped half. Finally the n-doped surface is removed by the described process to such an extent that the parts previously alloyed-in are visible as elevations. When this happens the etching is finished.

The arrangement according to the invention can of course also be manufactured by the double-diffusion method or by other methods. The broken line 15 indicates the boundary of the emitter zone 3 before the alloying-in of electrodes 1 and 2. In particular when using the double diffusion process the base connections 6 and 7 can be made by covering these points with a crystal layer for example before the emitter diffusion. If after removal of the crystal layer the slices are finally placed in a suitable metallic salt solution, as is often used for example for making pn-junctions visible, the metal contacts 1 and 2 can be made on the zones 6 and 7.

What is claimed is:

1. A pn-junction transistor comprising:

(a) a semiconductor crystal body including two zones of one conductivity type as emitter and collector zones separated by a zone of opposite conductivity type as base zone;

(b) two separate electrodes, said two electrodes being ohmically connected to said base zone at spaced apart points; and (c) means for electrically interconnecting one of said two electrodes with said emitter zone, thereby providing, in cooperation with said two separate electrodes, an electrical field in the base zone for the purpose of restricting the emission current flow from said emitter zone.

2. Junction transistor as in claim 1 wherein the base zone is doped with impurities to the order of $10^{18}$ per cm.$^3$.

3. Junction transistor as in claim 1 wherein the emitter zone is doped 3 to 10 times as strongly as the base zone.

4. Junction transistor as in claim 1 wherein the emitter zone and the base zone are connected by a metallic coating.

5. Junction transistor as in claim 1 wherein said semiconductor body has a mesa structure.

6. Junction transistor as defined in claim 1 wherein said two electrodes are provided on the emitter side of said body, the first of said electrodes being the base electrode and receiving the base potential and the second electrode carrying the emission current.

7. Junction transistor as in claim 6 wherein the width of the emitter zone between the two electrodes on the emitter side is being 10 and 100$\mu$.

8. Junction transistor as in claim 6 wherein the boundary surface between the first electrode and the emitter zone is no larger than the emitting region.

9. Junction transistor as in claim 6 wherein the first electrode is an alloyed electrode, the semiconductor zone pertaining to said alloyed electrode being doped more strongly than the base zone.

10. Junction transistor as in claim 6 wherein one of the electrodes encircles the other.

11. Junction transistor as in claim 6 wherein the emitter zone is embedded in the base zone and wherein part of the emitter-base pn-junction is perpendicular to the semiconductor surface and adjacent to the second electrode, said part of said emitter-base pn-junction being a backward diode.

12. Junction transistor as in claim 11 wherein the first electrode and the second electrode are alloyed adjacent to the emitter zone on the emitter side and wherein the emitter zone and the recrystallization zone of the second alloyed electrode are doped to render the pn-junction between the emitter zone and said recrystallization zone into said backward diode.

13. Junction transistor as in claim 11 wherein the first electrode and the second electrode are adjacent to the emitter zone on the emitter side.

14. Junction transistor as in claim 1 wherein said means comprise a connecting zone of variable thickness provided between the base and collector zones, said connecting zone being an intrinsically conductive zone or a zone which is doped more weakly than the other zones.

15. Junction transistor as in claim 14 wherein there is an abrupt junction between the collector zone and said connecting zone.

16. Junction transistor as in claim 14 wherein the transistor has an emitting portion and said connecting zone is thinner in the region of said emitting portion than in the remaining regions of the seemiconductor body.

17. Junction transistor as in claim 14 wherein said collector zone is heavily doped and therefore has a small collector bias resistance.

18. Junction transistor as defined in claim 6 wherein said second electrode is connected with the emitter zone by means of a metallic coating.

19. Junction transistor as defined in claim 6 wherein the emitter zone is embedded in the base zone, wherein said first and second electrodes are on that portion of the semiconductor surface which is the surface of the base zone, and wherein said second electrode is connected with the emitter zone by means of a metallic coating.

20. Junction transistor as defined in claim 6 wherein there are two zones of the same conductivity type as the base zone, said two zones being adjacent to the emitter zone, said two zones being connected with that portion of the base zone which is ahead of the emitter zone, and wherein the emitter zone and the second of said two zones are ohmically connected to each other.

21. Junction transistor as defined in claim 20, comprising ohmic contact electrodes, serving in the collector zone as collector electrode, and in the zones which abut the emitter zone as said base electrode and as said emission current carrying electrode.

22. Junction transistor as defined in claim 20 wherein said two zones which are adjacent said emitter zone and which are of the same conductivity type as said base zone are alloyed zones.

References Cited

UNITED STATES PATENTS

| | | | |
|---|---|---|---|
| 3,138,747 | 6/1964 | Stewart | 317—235 |
| 2,967,793 | 1/1961 | Philips | 317—235.41 |
| 3,015,048 | 12/1961 | Noyce | 317—235 |
| 3,078,196 | 2/1963 | Ross | 317—235.44 |
| 3,083,441 | 4/1963 | Little et al. | 317—235 |
| Re. 24,872 | 9/1960 | Early | 317—235 |

JAMES D. KALLAM, *Primary Examiner.*

U.S. Cl. X.R.

317—234; 29—569